Figure 1:
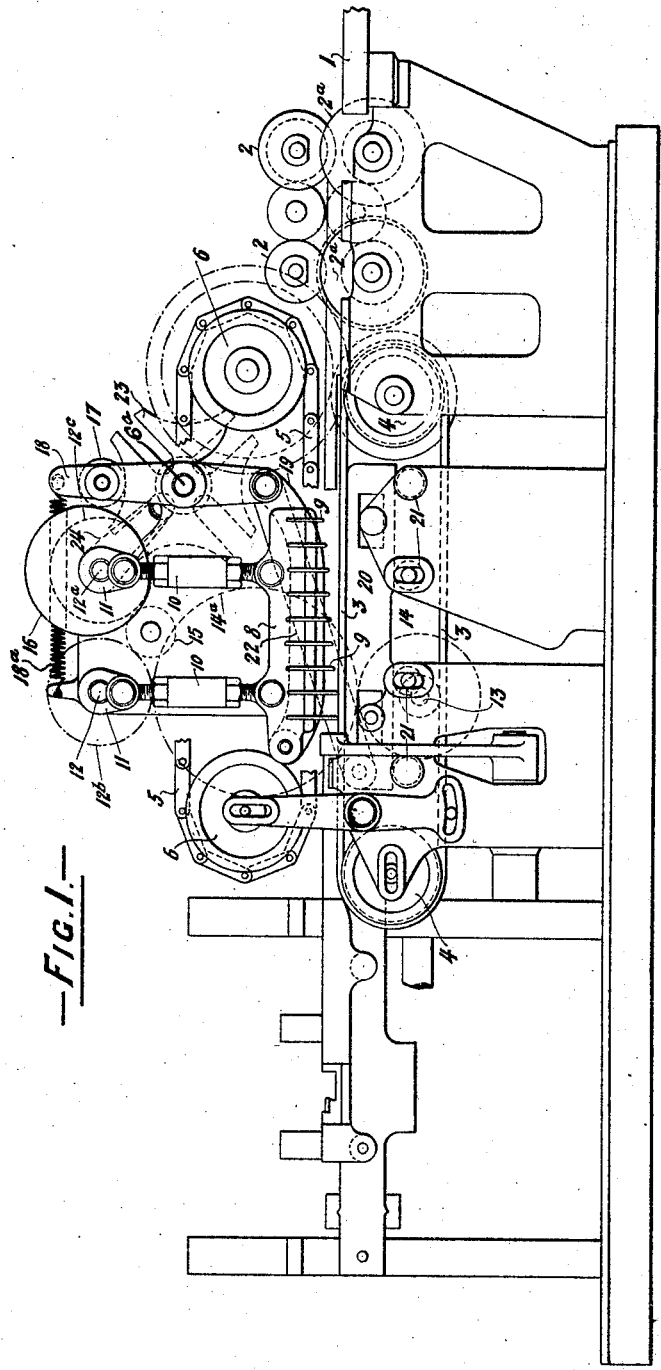

March 8, 1927.

F. GROVER 1,620,546

APPARATUS FOR DIVIDING PLASTIC MATERIAL INTO SEPARATE
TABLETS OF UNIFORM SIZE

Filed April 27, 1926   2 Sheets-Sheet 1

Inventor
Frederick Grover
By his attorneys

March 8, 1927.

F. GROVER 1,620,546

APPARATUS FOR DIVIDING PLASTIC MATERIAL INTO SEPARATE
TABLETS OF UNIFORM SIZE

Filed April 27, 1926  2 Sheets-Sheet 2

Inventor
Frederick Grover
By
his Attorneys.

Patented Mar. 8, 1927.

1,620,546

UNITED STATES PATENT OFFICE.

FREDERICK GROVER, OF LEEDS, ENGLAND, ASSIGNOR TO THE FORGROVE MACHINERY COMPANY LIMITED, OF LEEDS, ENGLAND.

APPARATUS FOR DIVIDING PLASTIC MATERIAL INTO SEPARATE TABLETS OF UNIFORM SIZE.

Application filed April 27, 1926. Serial No. 104,956, and in Great Britain May 2, 1925.

This invention relates to a new or improved apparatus for dividing plastic material into separate tablets of uniform size, and it is especially applicable to the division of sweetmeats, such for instance as caramels, which are subsequently wrapped in paper or in tin foil.

The cutting into separate tablets of plastic material has before been accomplished, by feeding the plastic material in the form of a strip to a succession of blades held on a disc and kneading the plastic material against the blades as the disc is slowly rotated, thus causing the blades to gradually enter the plastic material until the divisions in the strip are completed, and the separate tablets are discharged from the space between the blades. This method of dividing the strip has the advantage of giving sufficient time for the cutting operation to permit the tablets to be divided without distortion, which arises if the cutting is performed too quickly, as by successive shearing or complete cutting operations dealing with one tablet only at a time.

According to this invention, the strip of plastic material is subject to a multiple progressive cutting operation, during which a plurality of divisions are formed simultaneously by a cutting operation, the cutting being performed progressively deeper as the strip advances through the machine. Instead, however, of the strip being fed to the blades and being kneaded against the blades and remaining in contact with the blades throughout the cutting operation as heretofore, a multiple blade holder carrying equidistant blades is employed, the blades of which are withdrawn from the divisions being cut in the strip and caused to re-enter the divisions step by step, until the forward division, which increases in depth as the strip proceeds, completely separates the forward portion of the strip and delivers it as a separate tablet to the wrapping mechanism of the machine.

The cutting mechanism consists of a series of blades mounted at equal distances apart on a horizontal holder or bar, which is given a vertical movement for lowering the blades onto the strip and is also given a horizontal movement in order to feed or follow the movement of the strip to be divided. Below the blades is an endless belt forming a bed onto which is fed the strip of plastic material to be divided.

The bar carrying the blades is alternately lowered and raised towards the endless belt, and the depth of the blades depending from the bar is progressively greater from the feed end of the bar to the delivery end of the bar, so that the cutting lower edges of the blades at the delivery end become progressively nearer to the endless belt. Alternatively this effect may be attained by suitably adjusting the angle of the bar.

The endless belt is supported on its under-side by a suitable supporting surface located below the belt, in such a manner that the strip being cut is supported against the pressure of the blades during its travel whilst subject to the progressive cutting operation. When the bar carrying the blades has completed a forward movement travelling with the plastic strip and with the endless belt, the blades are then withdrawn from the plastic strip, and the plastic material is prevented from rising with the blades by reason of projections or fingers located over each partially formed tablet, and which travel forward equally with the plastic material and are located between the blades. These fingers may be suitably carried on a chain working in conjunction with the remainder of the mechanism. The bar now continues rising, until the blades thereby are entirely free from the plastic material, and move in a rearward direction and then descend, the blades all entering the divisions one or more distances towards the feed. The blades now enter divisions which have been cut to a lesser depth in the previous action of the blades, and as the bar travels forward, the blades cut more deeply into the divisions, completely severing the forward tablet and increasing the depth of the divisions between all the following partially severed tablets.

The progress of the strip through the machine may be continuous or intermittent, this being a matter of design in the arrangement of the relative feeding motions given to the supporting surface, the endless belt and the bar carrying the blades, and the mechanism feeding the strip of plastic material.

Figure 2:
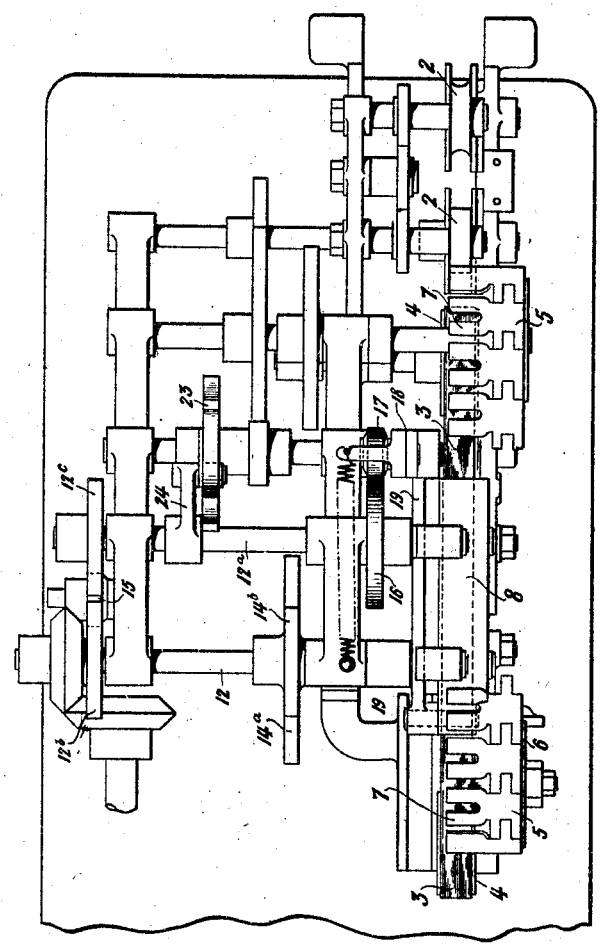

An example of construction of a machine in accordance with this invention for dividing plastic material is shown in the accompanying drawings, in which Fig. 1 is an elevation, and Fig. 2 a plan view.

The plastic material to be divided is placed upon a table 1, and is drawn out by hand into rope form, and is fed between feed rollers 2 and 2ª which roll the material into a strip of the desired cross section, which is usually rectangular. The forward end of the strip passes on to an endless belt 3 supported on rollers 4. Above and parallel with the belt 3 is an endless chain 5 carried by chain rollers 6, and chain carrying a series of laterally projecting fingers 7 (see Fig. 2).

Above the endless belt 3 carrying the strip of material is a bar 8, from the under side of which projects a series of blades 9, each succeeding blade, from the feed end of the machine, depending a progressive amount. This bar 8 is supported by means of links 10, the upper ends of which are attached to crank arms 11 upon shafts 12, 12ª. These shafts 12, 12ª are both driven in the same direction from the main drive shaft 13 through gear wheels 14, 14ª, 14ᵇ and 12ᵇ on the shaft 12, intermediate wheel 15, and gear wheel 12ᶜ on shaft 12ª, whereby the bar 8 is raised and lowered. This bar 8 is given a horizontal movement to and fro by means of a cam 16, mounted on the shaft 12ª against which a bowl 17 carried upon a rocking lever 18 is maintained in contact by means of a spring 18ª. The lower end of the lever 18 supports one end of a link 19, the other end being pivotally attached to the bar 8.

The fingers 7 carried by the chain 5 are arranged to project beneath the said bar and one between each of the blades 9.

The belt 3 is supported against the cutting pressure exerted by the blades by means of a supporting surface 20 mounted upon anti-friction rollers 21, and given a forward and backward movement by means of links 22 pivotally attached to the supporting surface 20 and to the lower end of the lever 18.

The progress of the strip of plastic material through the machine may be either intermittent or may be continuous, but in the example of construction shown in the drawings its progress is intermittent. The two shafts 12, 12ª are given a continuous rotation as before described and raise and lower the bar 8, while the cam 16 rocks the lever 18 at required times to give, through link 19, a longitudinal to and fro movement to the bar 8 carrying the blades 9, and a similar movement to the supporting surface 20 beneath the belt 3 through the link 22, while a step by step motion is given to the chain 5, belt 3, and the feed rollers 2 and 2ª through gearing driven and controlled by a device 23, somewhat similar to a Geneva stop device, fixed on a shaft 6ª and actuated by an arm 24 on the shaft 12ª, whereby the parts which are to receive a step by step motion are all moved through the gearing at uniform speed. Instead of being driven by gearing, the belt 3 may be drawn forward by the horizontal movement of the blades 9, the belt 3 being nipped between the strip of plastic material and the support 20 during the cutting operation.

The horizontal throw given to the bar 8 carrying the blades 9 in a forward direction is equal to the progress of the strip of material and to the forward movement of the supporting surface 20 and to the traverse of the chain 5. The return movement of the supporting surface 20 takes place during the time the blades are lifted free from the strip of material.

When the blades are lowered, they register with the divisions already partially cut, and the distance between the blades corresponds to the feed so that they enter the divisions the distance of one feed nearer towards the feed end of the machine with each lowering of the bar and blades. With each throw of the bar, a tablet is completely severed from the strip, and the severed tablet is then presented to the wrapping mechanism, which is used in conjunction with this apparatus but which does not form part of this invention.

What I claim as my invention and desire to secure by Letters Patent is:—

1. Apparatus for dividing plastic material into separate tablets of uniform size, comprising in combination a multiple blade holder, equidistant blades projecting from the blade holder to progressively different depths, means for lowering and raising the blade holder, means for horizontally reciprocating the said blade holder, a bed for supporting and carrying the plastic material below the aforesaid blades, and means for advancing the bed carrying the plastic material while the blades are lowered.

2. Apparatus for dividing plastic material into separate tablets of uniform size, comprising in combination a multiple blade holder, equidistant blades projecting from the blade holder to progressively different depths, means for lowering and raising the blade holder, means for horizontally reciprocating the said blade holder, a belt for carrying the plastic material below the aforesaid blades, a bed for supporting the belt, and means for advancing the belt carrying the plastic material while the blades are lowered.

3. Apparatus for dividing plastic material into separate tablets of uniform size, comprising in combination a multiple blade holder, equidistant blades projecting from the blade holder to progressively different depths, means for lowering and raising the blade holder, means for horizontally reciprocating the said blade holder, a belt for carrying the plastic material below the aforesaid blades, a bed for supporting the belt, means for reciprocating the said bed, and means for advancing the belt carrying the plastic material while the blades are lowered.

4. Apparatus for dividing plastic material into separate tablets of uniform size, comprising in combination a multiple blade holder, equidistant blades projecting from the blade holder to progressively different depths, means for lowering and raising the blade holder, means for horizontally reciprocating the said blade holder, a belt for carrying the plastic material below the aforesaid blades, a bed for supporting the belt, means for reciprocating the said bed, means for advancing the belt carrying the plastic material while the blades are lowered, and means for holding the partly severed tablets upon the belt when the blades are raised.

5. Apparatus for dividing plastic material into sparate tablets of uniform size, comprising in combination a multiple blade holder, equidistant blades projecting from the blade holder to progressively different depths, connecting rods supporting such blade holder, rotary cranks carrying the upper ends of such connecting rods, means for horizontally reciprocating the said blade holder, a belt for carrying the plastic material below the aforesaid blades, a bed for supporting the belt, means for reciprocating the said bed, means for advancing the belt carrying the plastic material while the blades are lowered, and means for holding the partly severed tablets upon the belt when the blades are raised.

6. Apparatus for dividing plastic material into separate tablets of uniform size, comprising in combination a multiple blade holder, equidistant blades projecting from the blade holder to progressively different depths, connecting rods supporting such blade holder, rotary cranks carrying the upper ends of such connecting rods, a connecting rod attached to such blade holder, a rocking lever connected to the other end of such connecting rod, a belt for carrying the plastic material below the aforesaid blades, a bed for supporting the belt, means for reciprocating the said bed, means for advancing the belt carrying the plastic material while the blades are lowered, and means for holding the partly severed tablets upon the belt when the blades are raised.

7. Apparatus for dividing plastic material into separate tablets of uniform size, comprising in combination a multiple blade holder, equidistant blades projecting from the blade holder to progressively different depths, connecting rods supporting such blade holder, rotary cranks carrying the upper ends of such connecting rods, a connecting rod attached to such blade holder, a rocking lever connected to the other end of such connecting rod, a belt for carrying the plastic material below the aforesaid blades, a Geneva cross movement for conveying step by step movement to said belt, a bed for supporting the belt, and means for holding the partly severed tablets upon the belt when the blades are raised.

8. Apparatus for dividing plastic material into separate tablets of uniform size, comprising in combination a multiple blade holder, equidistant blades projecting from the blade holder to progressively different depths, connecting rods supporting such blade holder, rotary cranks carrying the upper ends of such connecting rods, means for horizontally reciprocating the said blade holder, a belt for carrying the plastic material below the aforesaid blades, a Geneva cross movement for conveying step by step movement to said belt, a bed for supporting the belt, an endless chain having similar step by step movement to the belt, and laterally projecting fingers on the chain for holding the partly severed tablets down upon the belt when the blades are raised.

In witness whereof I have hereunto set my hand.

FREDERICK GROVER.